(12) United States Patent
Yoshimoto et al.

(10) Patent No.: US 9,073,518 B2
(45) Date of Patent: Jul. 7, 2015

(54) VEHICLE WIPER

(75) Inventors: Takao Yoshimoto, Toyohashi (JP); Naoki Torii, Toyohashi (JP); Masahiro Oota, Hamamatsu (JP); Masahiro Kitamura, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 123 days.

(21) Appl. No.: 13/611,872

(22) Filed: Sep. 12, 2012

(65) Prior Publication Data

US 2013/0239353 A1   Sep. 19, 2013

(30) Foreign Application Priority Data

| Sep. 15, 2011 | (JP) | ................. | 2011-202127 |
| Sep. 26, 2011 | (JP) | ................. | 2011-209896 |
| Sep. 26, 2011 | (JP) | ................. | 2011-209897 |
| Sep. 28, 2011 | (JP) | ................. | 2011-212713 |
| Jul. 30, 2012 | (JP) | ................. | 2012-168528 |

(51) Int. Cl.
   *B60S 1/38*   (2006.01)
   *B60S 1/40*   (2006.01)

(52) U.S. Cl.
   CPC ...... *B60S 1/38* (2013.01); *B60S 1/3858* (2013.01); *B60S 1/3851* (2013.01); *B60S 1/3863* (2013.01); *B60S 1/3881* (2013.01); *B60S 1/4048* (2013.01); *B60S 2001/4051* (2013.01); *B60S 2001/4054* (2013.01)

(58) Field of Classification Search
   CPC .... B60S 1/3848; B60S 1/3851; B60S 1/3849; B60S 1/4045; B60S 1/4048; B60S 1/4038; B60S 2001/4051; B60S 1/4054

USPC .......... 15/250.43, 250.201, 250.32, 250.361, 15/250.44, 250.351
   See application file for complete search history.

(56) References Cited

U.S. PATENT DOCUMENTS

| 6,599,051 | B1  | 7/2003  | Jarasson |
| 7,634,833 | B2* | 12/2009 | Boland et al. .............. 15/250.32 |
| 2004/0019997 | A1 | 2/2004 | Baseotto et al. |
| 2006/0021177 | A1 | 2/2006 | Marmoy et al. |
| 2006/0037167 | A1 | 2/2006 | Nacamuli |
| 2006/0156529 | A1 | 7/2006 | Thomar et al. |
| 2008/0066254 | A1 | 3/2008 | Vacher |
| 2008/0289133 | A1 | 11/2008 | Kim |
| 2009/0056049 | A1 | 3/2009 | Jarasson et al. |
| 2009/0064438 | A1* | 3/2009 | Boland et al. .............. 15/250.32 |
| 2009/0178226 | A1 | 7/2009 | Lee et al. |

(Continued)

FOREIGN PATENT DOCUMENTS

| DE | 100 36 115 A1 | 1/2003 |
| JP | 2002-533261   | 10/2002 |

(Continued)

*Primary Examiner* — Gary Graham
(74) *Attorney, Agent, or Firm* — Christensen Fonder P.A.

(57) ABSTRACT

A wiper for a vehicle includes an elongated wiper strip, a backing extending in the longitudinal direction of the wiper strip, and a blade holder for holding the wiper strip and the backing. The blade holder includes a pair of side surfaces that face in opposite directions. The wiper also includes a coupling member and a wiper arm. The coupling member has a pair of side walls, which face the corresponding side surfaces, and is attached to the blade holder. The wiper arm has a distal coupling portion attached to the coupling member. When the distal coupling portion is attached to the coupling member, side cover walls of the distal coupling portion are each engaged with the corresponding side wall of the coupling member.

11 Claims, 7 Drawing Sheets

(56) References Cited

U.S. PATENT DOCUMENTS

| | | | |
|---|---|---|---|
| 2009/0282637 A1* | 11/2009 | Weber et al. ............... 15/250.32 |
| 2010/0218330 A1 | 9/2010 | Fink et al. |
| 2011/0107542 A1 | 5/2011 | Op't Roodt |
| 2011/0113580 A1 | 5/2011 | Caillot et al. |
| 2011/0247167 A1 | 10/2011 | Huang |
| 2013/0067678 A1* | 3/2013 | Ehde ......................... 15/250.32 |
| 2014/0352099 A1 | 12/2014 | Fujiwara et al. |

FOREIGN PATENT DOCUMENTS

| | | |
|---|---|---|
| JP | 2002-534311 | 10/2002 |
| JP | 3107550 U | 12/2004 |
| JP | 2005-524567 A | 8/2005 |
| JP | 2006-500273 | 1/2006 |
| JP | 2006-103563 A | 4/2006 |
| JP | 2006-513928 | 4/2006 |
| JP | 2007-203948 A | 8/2007 |
| JP | 2007-531663 | 11/2007 |
| JP | 2008-285140 A | 11/2008 |
| JP | 2010-500949 | 1/2010 |
| JP | 3160871 U | 6/2010 |
| JP | 2010-179921 A | 8/2010 |
| JP | 2012-136150 A | 7/2012 |
| WO | WO 00/38964 | 7/2000 |
| WO | WO 00/40444 | 7/2000 |
| WO | WO02/40328 A1 * | 5/2002 |
| WO | WO 2004/028875 | 4/2004 |
| WO | WO 2004/076252 | 9/2004 |
| WO | WO 2005/108176 | 11/2005 |
| WO | WO 2005/118363 | 12/2005 |

* cited by examiner

VEHICLE WIPER

BACKGROUND OF THE INVENTION

The present invention relates to wipers for a vehicle.

Conventionally, a wiper for a vehicle includes a wiper arm and a wiper blade, which is coupled to the wiper arm. Japanese National Phase Laid-Open Patent Publication No. 2006-500273 describes a wiper blade having a wiper strip, a leaf-spring-like backing, and a blade holder. The backing imparts rigidity and resiliency to the wiper strip. The blade holder is attached to and holds the backing and the wiper strip. The wiper blade has a coupling device, which includes projections projected from opposite side surfaces of the coupling device and clips (joint members) attached rotationally to the corresponding projections and coupled to the wiper arm. A leg extending downward from each clip (toward a surface to be wiped) is formed in a distal portion of the wiper arm at a position corresponding to the rotational axis of the clip. A pair of end portions is formed in each of the legs and extends to surround the lower surface of the corresponding clip. The two end portions restrict relative vertical movement between the distal portion of the wiper arm and each clip. The distal portion of the wiper arm is thus fixed to the clip.

However, in the above-described wiper for a vehicle, components are overlapped with one another at positions at which the end portions are located. This increases the height of the wiper from a surface to be wiped.

SUMMARY OF THE INVENTION

Accordingly, it is an objective of the present invention to provide a wiper for a vehicle having a low profile with respect to a surface to be wiped.

To achieve the foregoing objective and in accordance with one aspect of the present invention, a wiper for a vehicle is provided. The wiper includes an elongated wiper strip having a wiping portion for wiping a surface to be wiped and a base portion; at least one leaf-spring-like backing extending in a longitudinal direction of the wiper strip, the backing imparting rigidity and resiliency to the wiper strip; and a blade holder for holding the wiper strip and the backing at longitudinally middle portions of the wiper strip and the backing. The blade holder includes a blade holding portion. The blade holding portion surrounds the base portion and the backing at the longitudinally middle portions and holds the base portion and the backing to restrict movement of the base portion and the backing each in a direction perpendicular to the longitudinal direction. The blade holder also includes a pair of side surfaces facing in opposite directions. The wiper also includes a coupling member that has a pair of side walls facing the corresponding side surfaces. The coupling member is attached to the blade holder such that the coupling member is allowed to rotate about a rotational axis perpendicular to each of the two side surfaces. The wiper also includes a wiper arm having a distal coupling portion attached to the coupling member. An engagement projection is formed on an outer side surface of each of the side walls of the coupling member. The distal coupling portion has an upper cover wall for substantially covering an upper surface of the coupling member and a pair of side cover walls for substantially covering the outer side surfaces of the corresponding side walls. Each of the side cover walls includes an engagement recess that becomes engaged with the corresponding one of the engagement projections in a state in which the distal coupling portion is attached to the coupling member in a longitudinal direction of the distal coupling portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
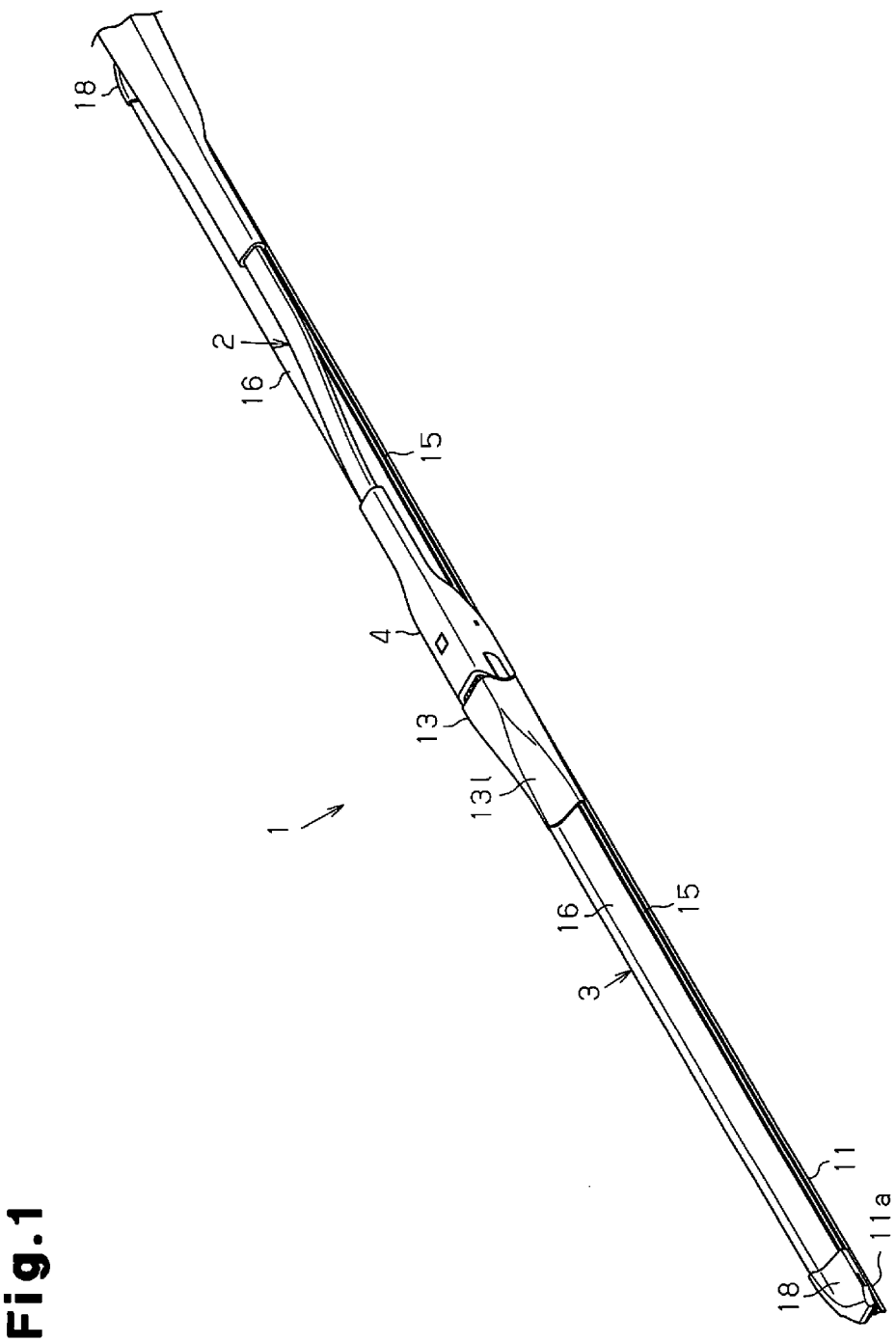
FIG. 1 is a perspective view illustrating a vehicle wiper according to one embodiment of the present invention.

One embodiment according to the present invention will now be described with reference to FIGS. 1 to 11. A vehicle wiper 1 shown in FIG. 1 is adapted for wiping, for example, rain droplets off the surface of a vehicle windshield. The vehicle wiper 1 is formed of a wiper arm 2 and a wiper blade 3, which is coupled to the distal end of the wiper arm 2. The wiper arm 2 includes a distal coupling portion 4, to which the wiper blade 3 is coupled. A pivot shaft (not shown) is fixed to the proximal end of the wiper arm 2. The pivot shaft is rotated by drive force of a wiper motor (not shown) within a predetermined angle, and the wiper arm 2 is swung to-and-fro in accordance with the rotation of the pivot shaft. The distal coupling portion 4 is urged toward the windshield by an urging mechanism (not shown).

Figure 2:
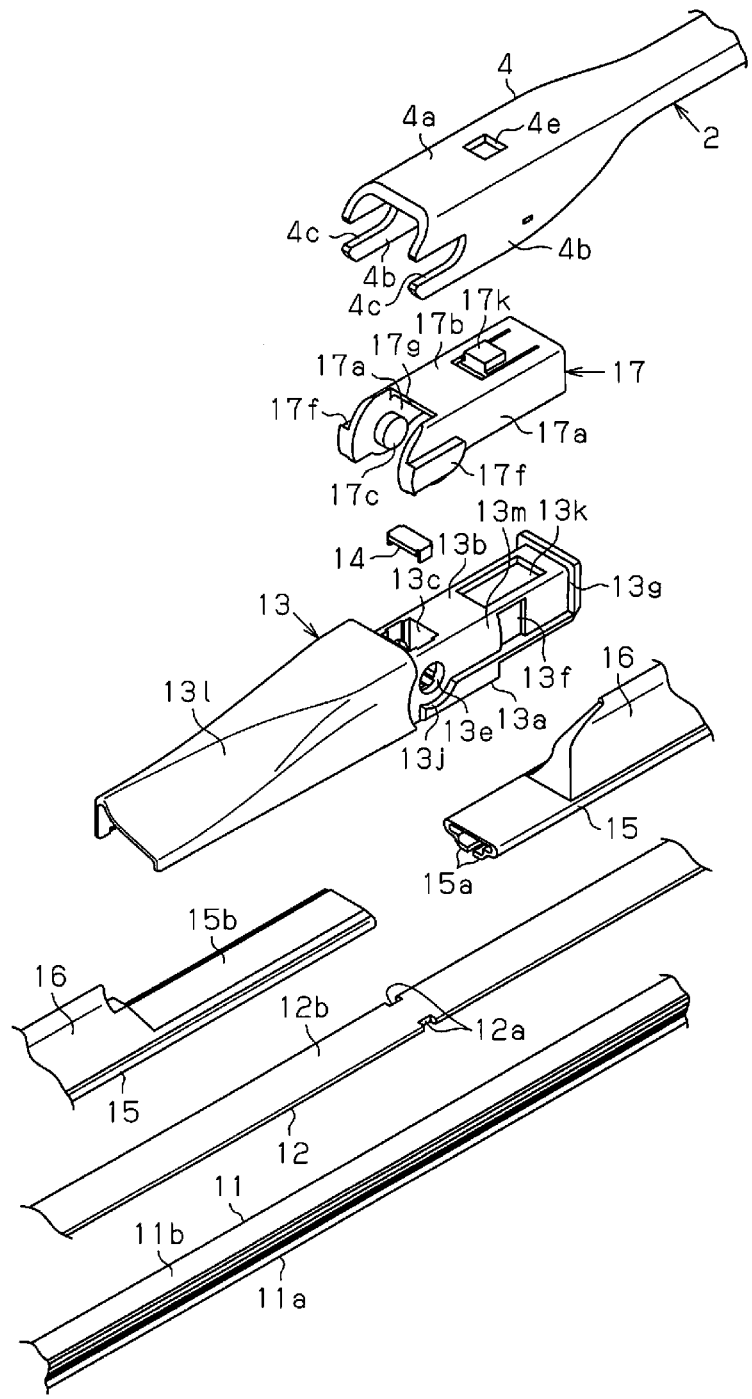
FIG. 2 is an exploded perspective view showing a portion of the wiper illustrated in FIG. 1.
Figure 3:
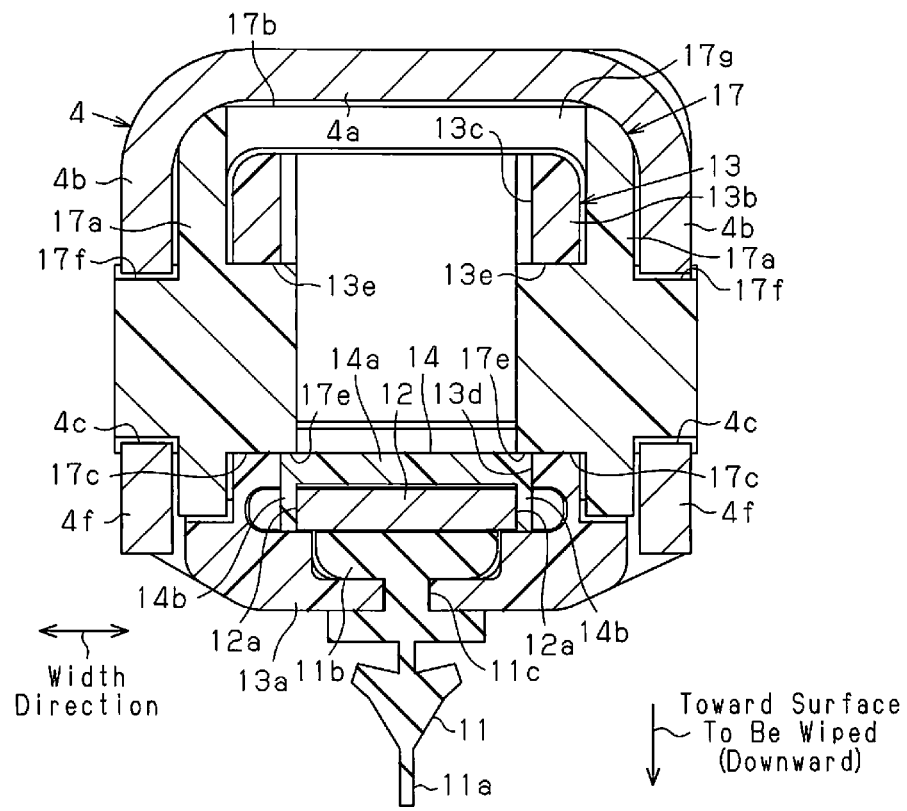
FIG. 3 is a cross-sectional view showing a portion of the wiper illustrated in FIG. 1.
Figure 4:
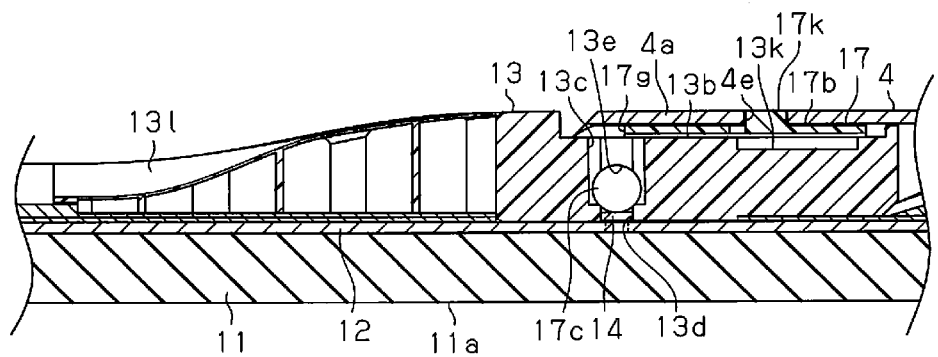
FIG. 4 is a cross-sectional view showing a portion of the wiper illustrated in FIG. 1.

As illustrated in FIGS. 2 to 4, the wiper blade 3 has an elongated wiper strip 11, which includes a wiping portion 11a for wiping the windshield, and a leaf-spring-like backing 12. The backing 12 extends in the longitudinal direction of the wiper strip 11 and imparts rigidity and resiliency to the wiper strip 11. The rigidity is transverse rigidity in a direction parallel to the surface to be wiped. The resilience is vertical resilience in a direction perpendicular to the surface to be wiped. With reference to FIG. 3, the wiper strip 11 of the illustrated embodiment includes a base portion 11b and a constriction 11c. The base portion 11b has a substantially rectangular cross section extending perpendicular to the longitudinal direction. The constriction 11c extends downward from a middle portion of the base portion 11b in the direction of the width of the base portion 11b. The wiping portion 11a extends downward from the constriction 11c. In the illustrated embodiment, as illustrated in FIGS. 2 and 3, the wiper blade 3 includes the single backing 12. A pair of backing engagement portions 12a is formed at the longitudinal center of the backing 12. The backing engagement portions 12a are formed by cutting opposite portions of the backing 12 in the width direction toward the center of the backing 12 in the width direction.

As shown in FIG. 3, the wiper blade 3 has a blade holder 13. The blade holder 13 includes a blade holding portion 13a. The blade holding portion 13a surrounds the portion of the base portion 11b and the portion of the backing 12 at the longitudinally middle portions of the wiper strip 11 and the backing 12. The blade holding portion 13a also holds the base portion 11b and the backing 12 to restrict movement of the base portion 11b and the backing 12 each in a direction perpendicular to the longitudinal direction.

Figure 5A:
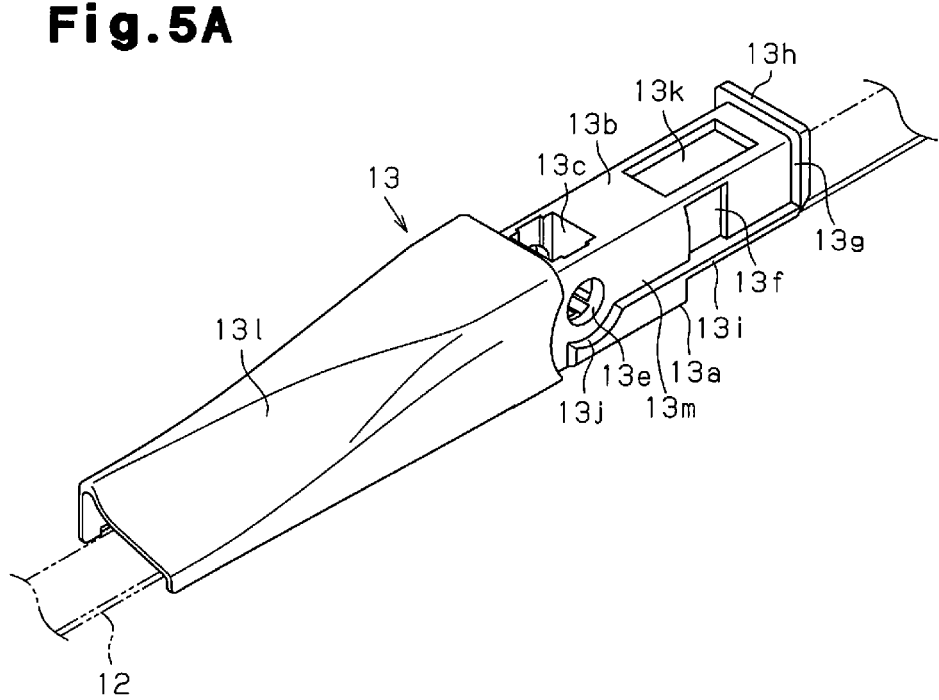
FIGS. 5A and 5B are perspective views each showing the blade holder illustrated in FIG. 1.
Figure 5B:
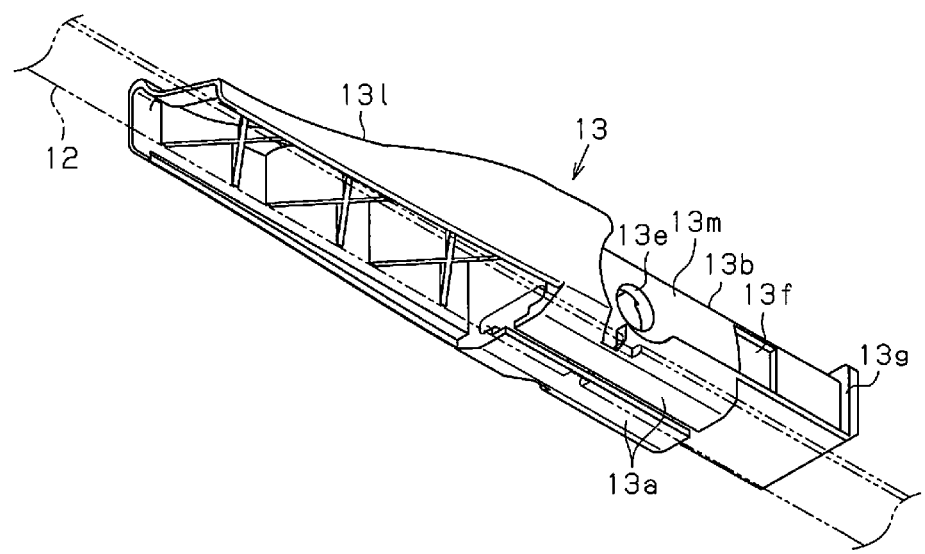

Specifically, the blade holder 13 is formed of hard plastic and, as illustrated in FIGS. 2 to 4 and FIGS. 5A and 5B, includes a holder body portion 13b shaped substantially like a parallelepiped. With reference to FIGS. 3 and 5B, the blade holding portion 13a is shaped to have arms that extend downward from opposite side portions of the lower surface of the holder body portion 13b in the width direction and then project inward in the width direction of the holder body portion 13b. As illustrated in FIG. 3, the blade holding portion 13a of the illustrated embodiment surrounds the base portion 11b and the backing 12 with the backing 12 held in contact with (mounted on) the upper end surface of the base portion 11b.

Referring to FIGS. 2 to 4 and 5A, an opening 13c is formed in the vicinity of a first end portion of the holder body portion 13b in the longitudinal direction and extends through the holder body portion 13b from the upper surface of the holder body portion 13b to the blade holding portion 13a. As viewed in the vertical direction, the opening 13c is formed substantially in a rectangular shape. As illustrated in FIG. 4, the longitudinal interval between the wall surfaces of the opening 13c is decreased at the lower end portion of the opening 13c to form a part accommodating portion 13d for accommodating a support part 14 (see FIG. 2) serving as a movement restricting member, which will be described later.

With reference to FIGS. 2 to 4, 5A, and 5B, shaft insertion holes 13e are formed in the first end portion of the holder body portion 13b at the position corresponding to the opening 13c. The shaft insertion holes 13e each extend through the holder body portion 13b in a direction perpendicular to a pair of side wall surfaces 13m at opposite sides in the width direction of the holder body portion 13b. The shaft insertion holes 13e thus ensure communication between the opening 13c (the part accommodating portion 13d) and the exterior. In other words, the shaft insertion holes 13e extend through the corresponding inner wall surfaces of the opening 13c in the width direction of the opening 13c and open to the exterior.

As shown in FIGS. 2, 5A, and 5B, a guide groove 13f, which extends substantially in the vertical direction, is formed in each side wall surface 13m of the holder body portion 13b substantially at the longitudinal center of the holder body portion 13b. Specifically, the guide grooves 13f each extend in an arcuate shape coaxial with the corresponding shaft insertion hole 13e.

As illustrated in FIGS. 5A and 5B, a pair of stopper wall portions 13g, which extends in the vertical direction at the corresponding side wall surfaces 13m, is formed in a second end portion of the holder body portion 13b in the longitudinal direction and projected to opposite sides in the width direction. Further, referring to FIG. 5A, a top wall portion 13h, which extends in the width direction to connect the upper ends of the two stopper wall portions 13g together, is formed on the upper surface of the holder body portion 13b and projects from the holder body portion 13b.

Referring to FIG. 5A, a pair of lower wall portions 13i is formed at the lower end portions of the corresponding side wall surfaces 13m of the holder body portion 13b and projects from the holder body portion 13b. Each of the lower wall portions 13i extends from the lower end of the corresponding one of the stopper wall portions 13g to the first end portion of the holder body portion 13b. With reference to FIG. 5A, a facing surface 13j is formed in a first end portion of each lower wall portion 13i in the longitudinal direction and has an arcuate shape coaxial with the corresponding shaft insertion hole 13e.

With reference to FIGS. 4 and 5A, an escape groove 13k is formed substantially at the center of the upper surface of the holder body portion 13b.

Figure 9:
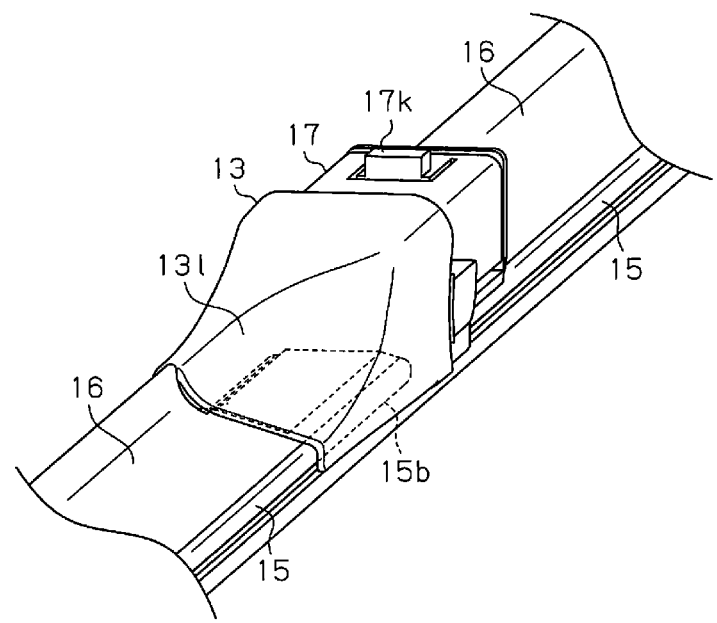
FIG. 9 is a perspective view showing the wiper blade illustrated in FIG. 1.

As illustrated in FIGS. 1, 2, and 9, the blade holder 13 includes a curved coupling portion 13l. The curved coupling portion 13l extends from the first end portion of the holder body portion 13b to the longitudinally distal end of the blade holder 13. The curved coupling portion 13l extends smoothly and continuously from a fin portion 16 of a case 15, which will be described later.

The blade holder 13, which has the above-described configuration, is attached to the backing 12 to restrict longitudinal movement of the blade holder 13 relative to the backing 12. Specifically, the backing 12 is inserted into the blade holding portion 13a of the blade holder 13 in the longitudinal direction of the backing 12. The backing 12 is positioned longitudinally such that the longitudinal position of the part accommodating portion 13d (see FIGS. 3 and 4) and the longitudinal position of the backing engagement portion 12a (see FIG. 2) correspond to each other. The support part 14 is sent into the part accommodating portion 13d from above through the opening 13c and thus engaged with the part accommodating portion 13d. The support part 14 is attached to the backing 12 and the blade holder 13 such that the support part 14 becomes longitudinally engaged with the backing 12 (the backing engagement portion 12a) and the blade holder 13 (the part accommodating portion 13d). This arrangement restricts longitudinal movement of the blade holder 13 and the backing 12 relative to each other. In other words, the blade holder 13 and the backing 12 are positioned in the longitudinal direction. As shown in FIG. 3, the support part 14 of the illustrated embodiment includes a middle portion 14a and a pair of arm portions 14b. The middle portion 14a extends in the direction of the width of the support part 14, as viewed in the longitudinal direction of the backing 12. The arm portions 14b extend downward from opposite ends of the middle portion 14a. The middle portion 14a is received in the part accommodating portion 13d and engaged longitudinally with the part accommodating portion 13d. The arm portions 14b are engaged longitudinally with the corresponding backing engagement portions 12a.

With reference to FIG. 2, a clip 17 serving as a coupling member coupled to the wiper arm 2, is mounted on the blade holder 13. The clip 17 is rotational about a rotational axis perpendicular to the side wall surfaces 13m, which is, in other words, the axis of each shaft insertion hole 13e.

The clip 17 has a pair of side walls 17a and an upper wall 17b. The side walls 17a each extend along the corresponding side wall surface 13m from a position corresponding to the rotational axis toward the longitudinal base end (the base end of the wiper arm). The upper wall 17b connects the two side walls 17a to each other and extends along the upper surface of the holder body portion 13b.

As illustrated in FIGS. 2 and 3, a support shaft 17*c* projects from an inner side surface of each of the side walls 17*a*. The support shafts 17*c* are inserted into the corresponding shaft insertion holes 13*e* to rotationally support the clip 17. The axial length of each of the support shafts 17*c* is set to such a value that, referring to FIG. 3, the support shafts 17*c* project into the opening 13*c*. A distal portion of each support shaft 17*c* functions as a stopper portion 17*e*, which contacts the upper surface of the support part 14 received in the part accommodating portion 13*d* to prevent upward separation of the support part 14. In the illustrated embodiment, each shaft insertion hole 13*e* and the inserted support shaft 17*c* configure rotational coupling portions.

As illustrated in FIGS. 2 and 6 to 8, an engagement projection 17*f* is formed on the outer side surface of each side wall 17*a*. Each of the engagement projections 17*f* is formed on the first longitudinal end portion of the corresponding one of the side walls 17*a*. Each engagement projection 17*f* is located opposite to the support shaft 17*c* with respect to the corresponding side wall 17*a*. The engagement projections 17*f* are each formed at the center of the corresponding side wall 17*a* in the vertical direction. Each engagement projection 17*f* has a pair of end surfaces 17*l*, which includes an upper end surface and a lower end surface. The end surfaces 17*l* extend substantially in the longitudinal direction and parallel to each other and face in opposite directions. The lower end surface of each engagement projection 17*f* is a round surface curved upward toward a longitudinal end of the engagement projection 17*f*.

Figure 6:
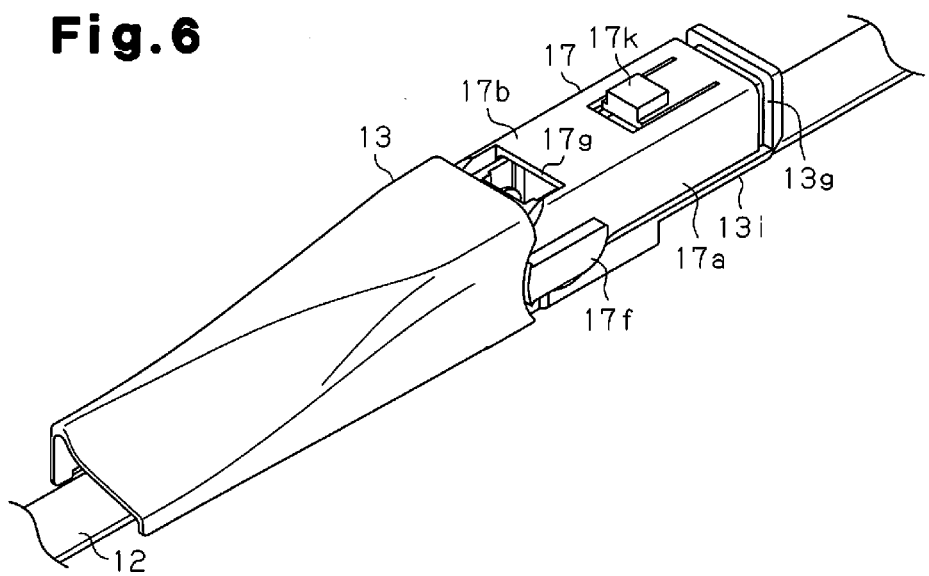
FIG. 6 is a perspective view showing the backing, the blade holder, and the clip illustrated in FIG. 1 each in an attached state.

With reference to FIG. 6, a cutout 17*g* for permitting the clip 17 to rotate is formed in an end portion of the upper wall 17*b* close to the rotational axis (an end portion close to the support shafts 17*c*, which is the first longitudinal end portion). Specifically, as illustrated in FIG. 2, each of the side walls 17*a* extends slightly closer to the longitudinal first side than the support shafts 17*c*. When the clip 17 rotates, the upper wall 17*b* of the clip 17 is moved toward the upper surface of the holder body portion 13*b* and may hit the upper surface. However, the cutout 17*g* in the clip 17 permits the clip 17 to rotate continuously, making it unnecessary to form a recess in the upper surface of the holder body portion 13*b*.

Figure 7:
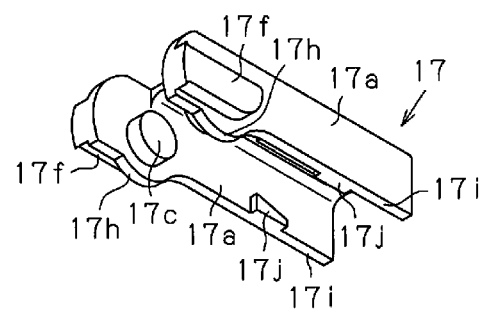
FIG. 7 is a perspective view showing the clip illustrated in FIG. 2.
Figure 8:
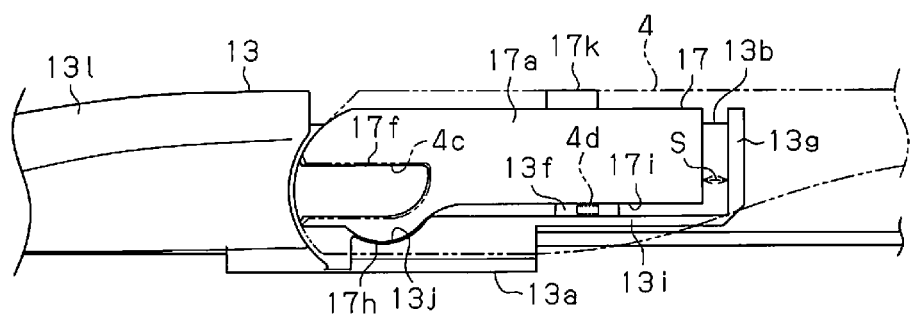
FIG. 8 is a side view corresponding to FIG. 6.

As illustrated in FIGS. 7 and 8, the lower end surface of each side wall 17*a* of the clip 17 includes an arcuate surface 17*h* (a second lower end surface) extending about the rotational axis (the axis of the support shaft 17*c* and the shaft insertion hole 13*e*). Referring to FIG. 8, each of the arcuate surfaces 17*h* faces the corresponding one of the facing surfaces 13*j*. In the illustrated embodiment, each arcuate surface 17*h* faces the corresponding facing surface 13*j* with a slight clearance between the arcuate surface 17*h* and the facing surface 13*j* when in an initial state (a state immediately after attaching). The arcuate surface 17*h* slides on the facing surface 13*j* when friction produces in the rotational coupling portions (13*e*, 17*c*).

The lower end surface of each side wall 17*a* includes an upper lower end surface 17*i* (a first lower end surface), which is spaced from the rotational axis (the support shaft 17*c*) toward the second longitudinal end. Each of the upper lower end surfaces 17*i* is located higher than the associated one of the arcuate surfaces 17*h*, which is arranged at the position corresponding to the rotational axis. In other words, in the illustrated embodiment, the lower end surface of each side wall 17*a* of the clip 17 projects in an arcuate shape only in a portion (the associated arcuate surface 17*h*) below the rotational axis (the axis of the support shaft 17*c*).

As shown in FIG. 8, when the clip 17 is attached to the blade holder 13, a clearance S, which extends in the vertical direction, is formed between the second longitudinal end portion of each side wall 17*a* and the corresponding stopper wall portion 13*g* in the longitudinal direction.

With reference to FIG. 7, a guide projection 17*j*, which is engageable with the corresponding guide groove 13*f* (see FIG. 5), projects from the inner side surface of each side wall 17*a*. Each one of the guide projections 17*j* is engaged with and guided by the corresponding one of the guide grooves 13*f* and restricts rotation of the clip 17 relative to the blade holder 13 at the positions corresponding to the opposite ends of the guide groove 13*f* in the vertical direction.

As illustrated in FIGS. 2, 4, and 6, an elastic projection 17*k*, which projects upward and flexible in the vertical direction, is formed on the upper wall 17*b* of the clip 17. The escape groove 13*k* in the blade holder 13 (see FIGS. 4 and 5A) is arranged at the position corresponding to the elastic projection 17*k* and permits the elastic projection 17*k* to flex downward while held in an attached state (see FIGS. 4 and 6).

As illustrated in FIGS. 1 and 2, the wiper blade 3 has a pair of cases 15, each of which includes a case holding portion 15*a* (see FIG. 2). Each of the case holding portions 15*a* surrounds and holds the base portion 11*b* of the wiper strip 11 and the backing 12 at the corresponding longitudinal side in the blade holder 13 (the corresponding blade holding portion 13*a*) to restrict movement of the base portion 11*b* and the backing 12 each in a direction perpendicular to the longitudinal direction of the base portion 11*b* and the backing 12.

Each of the cases 15 is formed of soft (flexible) plastic. Each of the case holding portions 15*a* is shaped identically with the blade holding portion 13*a*. In other words, when attached together, the blade holding portion 13*a* and the case holding portions 15*a* are longitudinally continuous from each other. The blade holding portion 13*a* and the case holding portions 15*a* surround (receive) the base portion 11*b* and the backing 12 along the full lengths of the blade holding portion 13*a* and the case holding portions 15*a*.

A fin portion 16 is formed on the upper surface of each case 15 through two-color molding. The fin portions 16 are formed of rubber or elastomer and each convert airstreams produced through traveling of the vehicle into pressing force acting on the surface to be wiped. Specifically, each of the fin portions 16 is shaped to have a curved surface. The height of each fin portion 16 from the surface to be wiped becomes greater toward the rear side of the vehicle when the wiper blade 3 is maintained at the stop position. With reference to FIGS. 2 and 9, the curved coupling portion 13*l* has such a shape that becomes matched to the shape of the curved surface of each fin portion 16 gradually from the holder body portion 13*b*, which is shaped substantially like a parallelepiped, toward the fin portion 16.

In the illustrated embodiment, the coupling portion between the one of the cases 15 corresponding to the curved coupling portion 13*l* (including the fin portion 16) and the blade holder 13 (the curved coupling portion 13*l*) is formed such that the upper end surfaces of the case 15 and the blade holder 13 become flush with each other. In other words, the aforementioned coupling portion is shaped in a continuously changing manner. As illustrated in FIGS. 2 and 9, the case 15 corresponding to the curved coupling portion 13*l* includes a stepped portion 15*b*, which extends longitudinally such that the upper surface of the stepped portion 15*b* is shielded by the blade holder 13.

As illustrated in FIG. 1, the wiper blade 3 has caps 18 fixed to the opposite longitudinal ends of the backing 12. The caps 18 each surround the corresponding longitudinal end portion of the backing 12, the corresponding longitudinal end portion of the case 15 (including the fin portion 16), and the corresponding longitudinal end portion of the base portion 11b.

The wiper blade 3 is coupled and fixed to the distal coupling portion 4 of the wiper arm 2 through the clip 17.

Figure 10:
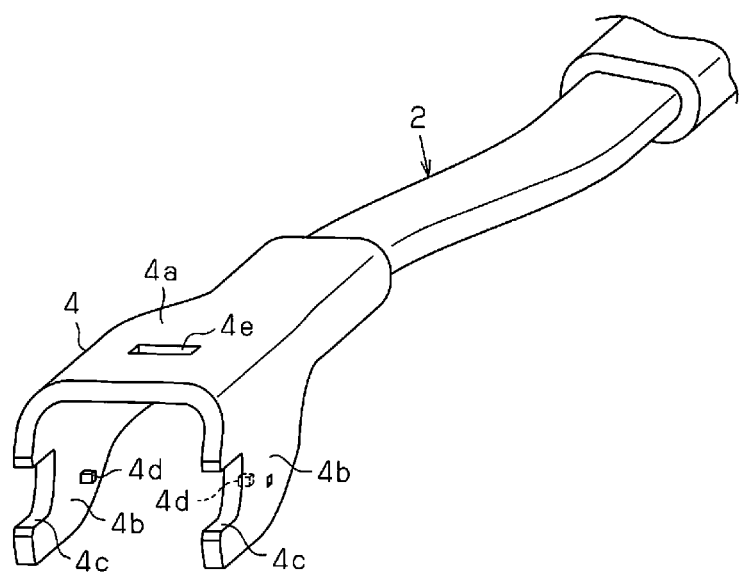
FIG. 10 is a perspective view showing the wiper blade illustrated in FIG. 1.

As illustrated in FIGS. 2 and 10, the distal coupling portion 4 includes an upper cover wall 4a and a pair of side cover walls 4b. The upper cover wall 4a substantially shields the upper surface of the clip 17 (the upper wall 17b). The side cover walls 4b shield the outer side surfaces of the clip (the side walls 17a). Referring to FIG. 2, the side cover walls 4b each have an engagement recess 4c. The engagement recesses 4c become engaged with the corresponding engagement projections 17f in the vertical direction when the distal coupling portion 4 is attached to the clip 17 in the longitudinal direction of the wiper arm 2. Each of the engagement recesses 4c has an opening faced to the longitudinal distal end (the first end) at a middle portion of the associated one of the side cover walls 4b in the vertical direction. The engagement recesses 4c are engaged with the corresponding engagement projections 17f in the vertical direction by inserting the engagement projections 17f into the engagement recesses 4c through the associated openings in the longitudinal direction (as switched from the state illustrated in FIG. 11 to the state illustrated in FIG. 8) and thus mounting the engagement projections 17f in the engagement recesses 4c.

Figure 11:
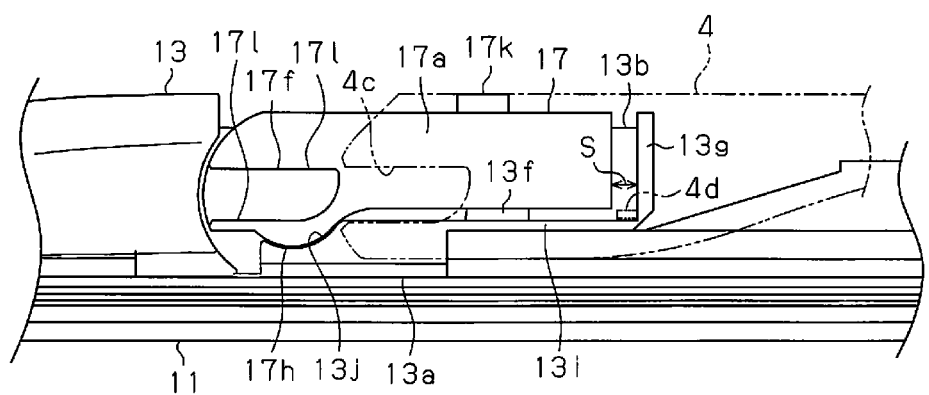
FIG. 11 is a side view showing the wiper for a vehicle illustrated in FIG. 1.

As illustrated in FIG. 10, a projection 4d serving as a stopper portion projecting inward in the width direction is formed through impression on the inner side surface of each side cover wall 4b. With reference to FIG. 11, each of the stopper wall portions 13g contacts the corresponding one of the projections 4d in the longitudinal direction when the engagement recesses 4c are each located at such a longitudinal position that the engagement recesses 4c are disengaged from the engagement projections 17f (as represented by the double-dotted chain lines in the drawing). That is, the projections 4d are brought into contact with the corresponding stopper wall portions 13g in the longitudinal direction as the state of the distal coupling portion 4 is switched from the state where the clip 17 is attached to the distal coupling portion 4 (see FIG. 8) to the state where the distal coupling portion 4 is longitudinally spaced from the clip 17 (see FIG. 11). Such contact between the projections 4d and the stopper wall portions 13g restrict further longitudinal movement of the distal coupling portion 4 relative to the clip 17 (further separation of the distal coupling portion 4 from the clip 17). When the projections 4d are held in contact with the stopper wall portions 13g in the longitudinal direction (see FIG. 11), the projections 4d are allowed to move in the vertical direction in the clearance S, which is formed between the stopper wall portions 13g and the second longitudinal end portions of the side walls 17a and extends in the vertical direction.

To join the distal coupling portion 4 to the clip 17, the distal coupling portion 4 is moved downward relative to the clip 17. Then, the distal coupling portion 4 is moved longitudinally relative to the clip 17 (to cause engagement between the engagement recesses 4c and the engagement projections 17f). The distal coupling portion 4 is thus attached to the clip 17. To detach the distal coupling portion 4 from the clip 17, the distal coupling portion 4 is moved longitudinally relative to the clip 17 (to disengage the engagement projections 17f from the engagement recesses 4c). The distal coupling portion 4 is then moved upward relative to the clip 17 to remove the distal coupling portion 4 from the clip 17.

As illustrated in FIG. 8, each projection 4d is located at such a position that the projection 4d contacts the upper lower end surface 17i of the clip 17 when the distal coupling portion 4 is attached to the clip 17.

The projections 4d are formed at such positions that the projections 4d contact the lower ends of the corresponding guide projections 17j (see FIG. 7) with the distal coupling portion 4 attached to the clip 17. Each projection 4d contacts the lower end of the corresponding guide groove 13f (see FIG. 5) to restrict rotation of the clip 17 and the distal coupling portion 4 in the corresponding direction relative to the blade holder 13. In other words, as the distal coupling portion 4 is joined to the clip 17, the projections 4d become integral with the corresponding guide projections 17j such that the projections 4d and the guide projections 17j both have improved rigidity and restrict rotation of the clip 17 and the distal coupling portion 4 in the aforementioned corresponding direction.

Referring to FIGS. 2, 4, and 10, the upper cover wall 4a has an engagement target hole 4e serving as an engagement target portion. The engagement target hole 4e receives and is thus engaged with the elastic projection 17k in the longitudinal direction when the distal coupling portion 4 is joined to the clip 17 (see FIG. 8) and the elastic projection 17k is not flexed downward. This prevents longitudinal movement of the distal coupling portion 4 and the clip 17 relative to each other, which may occur when the elastic projection 17k does not receive external force.

As shown in FIG. 3, each of the side cover walls 4b has a wrapping portion 4f, which extends downward to the position corresponding to the backing 12 in the vertical direction.

Operation of the wiper 1 for a vehicle will now be described.

In the wiper 1 for a vehicle, the wiper blade 3 (except for the clip 17) is rotational relative to the wiper arm 2 and the clip 17, which is fixed to the distal coupling portion 4 of the wiper arm 2. A non-illustrated urging mechanism urges the distal coupling portion 4 of the wiper arm 2 toward the windshield. The urging force is transmitted to the wiper strip 11 through the clip 17, the blade holder 13, and the backing 12. This presses the wiping portion 11a of the wiper strip 11 against the windshield along the full length of the wiping portion 11a. When the vehicle travels, the fin portions 16 convert airstreams produced by the vehicle to the pressing force acting on the windshield. The wiping portion 11a of the wiper strip 11 is thus pressed against the windshield. As a result, desirable wiping is carried out by reciprocally rotating the wiper arm 2 about the pivot shaft.

The illustrated embodiment has the advantages described below.

(1) The engagement projections 17f are each formed on the outer side surface of the corresponding side wall 17a of the clip 17. The engagement recesses 4c are formed in the corresponding side cover walls 4b of the distal coupling portion 4 of the wiper arm 2. The engagement recesses 4c are engaged with the corresponding engagement projections 17f in the vertical direction when the distal coupling portion 4 is joined to the clip 17 in the longitudinal direction of the wiper arm 2. Such engagement between the engagement recesses 4c and the engagement projections 17f restricts movement of the wiper arm 2 relative to the clip 17 in the vertical direction. This decreases the height from the surface to be wiped compared to, for example, a case having a pair of end portions extending to surround a lower surface of a clip (the conventional technique in which components are overlapped with one another in the vertical direction and thus the height from the surface to be wiped is great). Also, the shape of the distal coupling portion 4 of the wiper arm 2 is simplified compared to the case having the aforementioned end portions for surrounding the lower surface of the clip. This facilitates manufacture of the wiper arm 2.

(2) The blade holder 13 has the stopper wall portions 13g, which longitudinally contact the stopper portions (the projections 4d) formed in the distal coupling portion 4 when the distal coupling portion 4 is located at such a longitudinal position that the engagement projections 17f are disengaged from the engagement recesses 4c. The stopper wall portions 13g prevent the clip 17 and the wiper blade 3 from separating from the distal coupling portion 4. Specifically, in the above-described configuration, the distal coupling portion 4 is moved downward relative to the clip 17. The distal coupling portion 4 is then moved longitudinally relative to the clip 17 (to cause engagement between the engagement recesses 4c and the engagement projections 17f). The distal coupling portion 4 is thus joined to the clip 17. To remove the distal coupling portion 4 from the clip 17, the distal coupling portion 4 is moved relative to the clip 17 first in the longitudinal direction (to disengage the engagement projections 17f from the engagement recesses 4c) and then in an upward direction. Specifically, even when the wiper 1 for a vehicle is mounted in a vehicle and the clip 17 moves relative to the distal coupling portion 4 in the longitudinal direction, the urging force generated by the non-illustrated urging mechanism related to the wiper arm 2 prevents the distal coupling portion 4 from moving upward relative to the clip 17. As a result, the clip 17, or, in other words, the wiper blade 3, is prevented from separating from the distal coupling portion 4.

(3) The clip 17 has the upper lower end surfaces 17i, which are spaced from the rotational axis of the clip 17, and the arcuate surfaces 17h, which are located at the positions corresponding to the rotational axis of the clip 17. The upper lower end surfaces 17i are located higher than the arcuate surfaces 17h. Specifically, such locations of the upper lower end surfaces 17i are ensured by the fact that the rotational coupling portion (the support shaft 17c) is located at the position corresponding to the rotational axis but not at the position spaced from the rotational axis. The stopper portions are the projections 4d, which project to contact the corresponding upper lower end surfaces 17i when the distal coupling portion 4 is joined to the clip 17. Accordingly, in addition to the engagement recesses 4c and the engagement projections 17f, the upper cover wall 4a and the projections 4d restrict movement of the wiper arm 2 (the distal coupling portion 4) relative to the clip 17 in the vertical direction (in an assisting manner). As a result, when the wiper arm 2 is joined to the clip 17, movement of the wiper arm 2 (the distal coupling portion 4) relative to the clip 17 in the vertical direction is reliably restricted, or, in other words, integral rotation of the clip 17 and the wiper arm 2 (the distal coupling portion 4) is assisted.

(4) The projections 4d are located at such positions that the projections 4d contact the lower ends of the guide projections 17j of the clip 17. Each projection 4d contacts one of the ends of the corresponding guide groove 13f to restrict rotation of the clip 17 relative to the blade holder 13 in the corresponding direction. As a result, the projections 4d and the guide projections 17j both have improved rigidity and restrict the aforementioned rotation in a predetermined range.

(5) The elastic projection 17k is formed on the upper wall 17b of the clip 17. The engagement target hole 4e is formed in the upper cover wall 4a of the distal coupling portion 4. The engagement target hole 4e receives and thus becomes engaged with the elastic projection 17k in the longitudinal direction when the elastic projection 17k is not flexed downward. This prevents longitudinal movement of the distal coupling portion 4 and the clip 17 relative to each other, which may occur when the elastic projection 17k does not receive external force.

(6) The wiper strip 11 and the backing 12 are held by the blade holding portion 13a and the case holding portions 15a along the full lengths of the wiper strip 11 and the backing 12. The blade holding portion 13a and the case holding portions 15a thus restrict movement of the wiper strip 11 and the backing 12 in a direction perpendicular to the longitudinal direction. The blade holder 13 is connected to the wiper arm 2 through the clip 17 such that longitudinal movement of the blade holder 13 relative to the backing 12 is restricted. The backing 12 is thus fixed to the blade holder 13 without being displaced relative to the blade holder 13 in the longitudinal direction. Further, the two cases 15 are employed such that the blade holding portion 13a of the blade holder 13 is mounted directly on the upper surface 12b of the backing 12 between the case holding portions 15a of the cases 15. This arrangement decreases the extent of overlapping between components in the direction of the height of the wiper blade 3, compared to a case in which a single case corresponding to the full length of the backing 12 is employed and a blade holder holds a longitudinally middle portion of the case. As a result, the height from the surface to be wiped sufficiently decreases, thus providing a compact and low-profile wiper blade 3 to ensure desirable appearance.

(7) The cutout 17g is formed in the end of the upper wall 17b close to the rotational axis (the end of the upper wall 17b close to the support shaft 17c) to permit the clip 17 to rotate. This configuration permits the clip 17 to rotate without increasing the height of the upper wall 17b from the surface to be wiped and makes it unnecessary to form a recess for permitting rotation of the clip 17 in the upper surface of the holder body portion 13b. Without such a recess formed in the upper surface of the holder body portion 13b, the holder body portion 13b (the blade holder 13) is allowed to maintain improved rigidity.

(8) The rotational coupling portions (13e, 17c), which are rotationally joined to each other, are formed at the positions corresponding to the rotational axis in each side surface of the holder body portion 13b of the blade holder 13 and the corresponding side wall 17a of the clip 17. This arrangement allows the clip 17 to rotate relative to the blade holder 13. The arcuate surfaces 17h, which extend about the rotational axis, are formed on the lower end surfaces of the respective side walls 17a of the clip 17. The blade holder 13 has the facing surfaces 13j, which face the corresponding arcuate surfaces 17h. That is, this configuration includes additional portions for rotationally supporting the clip 17, other than the rotational coupling portions (13e, 17c). Specifically, the clip 17 constantly receives force (pressing force) acting downward (toward the surface to be wiped) from the wiper arm 2. However, by receiving the arcuate surfaces 17h in the lower end portions of the two side walls 17a of the clip 17 by the corresponding facing surfaces 13j of the blade holder 13, durability of the rotational coupling portions (13e, 17c) is improved. In the illustrated embodiment, the arcuate surfaces 17h face the corresponding facing surfaces 13j with a slight clearance formed between the arcuate surfaces 17h and the facing surfaces 13j in the initial state (the state immediately after attaching). This effectively facilitates assembly even without improving dimension accuracy and ensures smooth rotation of the rotational coupling portions (13e, 17c). When slight wear occurs in the rotational coupling portions (13e, 17c), the arcuate surfaces 17h slides on the blade holder 13 to prevent further wear in the rotational coupling portions (13e, 17c).

(9) The blade holder 13 has the curved coupling portion 13l, which extends continuously from the fin portion 16 of the corresponding one of the cases 15. The case 15 and the blade holder 13 are thus smoothly connected to each other. In other words, the case 15 is connected to the blade holder 13 without forming a large step between the case 15 and the blade holder 13, thus improving appearance of the wiper 1. Also, such smooth connection between the case 15 and the blade holder 13 ensures effective rectification of airstreams produced through traveling of the vehicle.

(10) The coupling portion between the case 15 (including the fin portion 16) and the blade holder 13 (the curved coupling portion 13*l*) is formed such that the upper end surfaces of the case 15 and the blade holder 13 become flush with each other. The appearance of the wiper 1 is thus improved. Further, the case 15 (including the fin portion 16) has the stepped portion 15*b*, which extends longitudinally such that the upper surface of the stepped portion 15*b* is shielded by the blade holder 13 (the curved coupling portion 13*l*). As a result, the stepped portion 15*b* prevents foreign objects such as snow or leaves from entering the interior of the wiper 1 through the coupling portion between the upper end surfaces of the case 15 and the blade holder 13.

(11) The blade holding portion 13*a* and the case holding portion 15*a* surround and hold the base portion 11*b* of the wiper strip 11 and the backing 12 with the backing 12 held in contact with the upper end surface of the base portion 11*b*. In other words, there is no wall between the wiper strip 11 and the backing 12. As a result, the height of the wiper blade 3 from the surface to be wiped is increased effectively compared to a case having a wall between the wiper strip 11 and the backing 12.

(12) The distal coupling portion 4 of the wiper arm 2 has the wrapping portion 4*f*, which extends downward to the position corresponding to the backing 12 in the vertical direction. The wrapping portion 4*f* prevents the blade holding portion 13*a* from deforming in a twisting manner together with the backing 12 at the position corresponding to the wrapping portion 4*f*.

(13) The support part 14 is attached to the backing 12 and the blade holder 13 in a manner longitudinally engaged with the backing 12 and the blade holder 13. The support part 14 restricts longitudinal movement of the backing 12 and the blade holder 13 relative to each other. Accordingly, by arranging the backing 12 and the blade holder 13 at corresponding positions and then attaching the support part 14 to the backing 12 and the blade holder 13, the backing 12 and the blade holder 13 are arranged at the fixed longitudinal positions relative to each other. In this manner, unlike a case in which an elastic engagement portion is formed integrally with a blade holder to restrict longitudinal movement of the blade holder relative to a backing, the wiper strip 11 and the blade holder 13 are attached together without being interfered by the elastic engagement portion. As a result, the wiper blade 3 is easily assembled and protected from damage (bend or wear) caused through assembly.

(14) The clip 17 has the stopper portions 17*e* (the distal portions of the support shafts 17*c*) for stopping the support part 14 from separating upward. As a result, by attaching the clip 17 to the blade holder 13, the support part 14 is automatically prevented from separating upward.

(15) Each support shaft 17*c* (the distal portion of each support shaft 17*c*) functions as the stopper portion 17*e*, which is inserted into the corresponding shaft insertion hole 13*e* formed in the blade holder 13 to rotationally support the clip 17. Since the support shaft 17*c* functions in two manners, the clip 17 is prevented from, for example, having a complicated shape.

The above illustrated embodiment may be modified to the forms described below.

In the above illustrated embodiment, the distal coupling portion 4 has the projections 4*d* each serving as the stopper portion and the blade holder 13 has the stopper wall portions 13*g*. However, the present invention is not restricted to this configuration but may be embodied without the projections 4*d* or the stopper wall portions 13*g*.

In the above illustrated embodiment, the stopper portions are the projections 4*d*, which project to contact the corresponding upper lower end surfaces 17*i* of the clip 17. However, the invention is not restricted to this. That is, as the stopper portions, for example, a longitudinal slit having an open end may be formed in each of the two side walls 17*a* of the clip 17 and a projection may be arranged in each of the slits movably in the longitudinal direction.

In the above illustrated embodiment, the projections 4*d* are arranged at such positions that the projections 4*d* contact the lower ends of the guide projections 17*j* of the clip 17. However, the present invention is not restricted to this arrangement. That is, the projections 4*d* may be arranged at positions offset from the lower ends of the guide projections 17*j*.

In the above illustrated embodiment, the cutout 17*g* for permitting rotation of the clip 17 is formed in the upper wall 17*b* of the clip 17. However, the invention is not restricted to this. That is, a recess for permitting rotation of the clip 17 may be formed in the upper surface of the holder body portion 13*b*.

In the above illustrated embodiment, the arcuate surfaces 17*h* are formed on the lower end surfaces of the two side walls 17*a* of the clip 17. The facing surfaces 13*j*, which face the corresponding arcuate surfaces 17*h*, are formed in the blade holder 13. However, the invention is not restricted to this and may be embodied including neither the arcuate surfaces 17*h* nor the facing surfaces 13*j*.

In the above illustrated embodiment, the blade holder 13 has the curved coupling portion 13*l*, which is connected smoothly to the fin portion 16 of the corresponding one of the cases 15. However, the invention is not restricted to this but may be embodied with a blade holder without the curved coupling portion 13*l*. The invention is not restricted to the cases 15 having the fin portions 16, either. That is, the fin portions 16 may be omitted in, for example, a wiper for wiping a rear glass window of a vehicle.

In the above illustrated embodiment, the coupling portion between the blade holder 13 (the curved coupling portion 13*l*) and the corresponding case 15 (including the fin portion 16) is formed such that the upper end surfaces of the case 15 and the blade holder 13 are flush with each other. However, the invention is not restricted to this and a step may be formed between the upper end surfaces in the coupling portion. Also, although the stepped portion 15*b*, which extends longitudinally such that the upper surface of the stepped portion 15*b* is shielded by the blade holder 13 (the curved coupling portion 13*l*), is formed in the case 15 (including the fin portion 16), the invention is not restricted to this. That is, the stepped portion 15*b* may be omitted.

In the above illustrated embodiment, the blade holding portion 13*a* and the case holding portion 15*a* surround the base portion 11*b* of the wiper strip 11 and the backing 12 with the backing 12 held in contact with the upper end surface of the base portion 11*b*. However, the invention is not restricted to this and a wall may be arranged between the wiper strip 11 and the backing 12. Specifically, the wall may be formed either integrally with or separately from the blade holding portion 13*a* and the case holding portion 15*a*.

In the above illustrated embodiment, the wrapping portion 4*f*, which extends downward to the position corresponding to the backing 12 in the vertical direction, is formed in the distal coupling portion 4 of the wiper arm 2. However, the invention is not restricted to this and the distal coupling portion may be formed without the wrapping portion 4f.

In the above illustrated embodiment, the support part 14 is attached to the backing 12 and the blade holder 13 to be engaged with the backing 12 and the blade holder 13 in the longitudinal direction. This restricts longitudinal movement of the backing 12 and the blade holder 13 relative to each other. However, the invention is not restricted to this and, for example, an elastic engagement portion for restricting longitudinal movement of the blade holder 13 relative to the backing 12 may be formed integrally with the blade holder 13.

In the above illustrated embodiment, the clip 17 has the stopper portions 17e (the distal portions of the support shafts 17c), which restrict upward separation of the support part 14. However, the invention is not restricted to this and may be embodied without the stopper portions 17e. In this case, the support part 14 (a movement restricting member) may include a stopper claw (engaged with the blade holder 13) for restricting separation of the support part 14 in the direction opposite to the direction in which the support part 14 is attached. This configuration also facilitates mounting of the support part 14 and automatically prevents separation of the support part 14 (the movement restricting member). Alternatively, for example, the support part 14 (the movement restricting member) may be press-fitted and fixed. Further, for example, the support part 14 (the movement restricting member) may be fixed through adhesion.

For example, instead of forming the stopper portions 17e in the clip 17, the movement restricting members may be formed integrally with the clip 17. This configuration decreases the number of components compared to a case where the support part (the movement restricting member) is arranged as a separate body.

The distal portions of the support shafts 17c are inserted into the shaft insertion holes 13e of the blade holder 13 and thus function each as the stopper portion 17e, which rotationally supports the clip 17. However, as long as the support part 14 is prevented from separating, the stopper portions may be formed in any other suitable portions (than the support shafts 17c) in the clip 17.

In the above illustrated embodiment, the holder body portion 13b has the opening 13c, which extends from the upper side of the holder body portion 13b to the blade holding portion 13a. The support part 14 is inserted into the part accommodating portion 13d from above through the opening 13c. However, instead of this, the support part 14 may be accommodated in the part accommodating portion 13d by any other suitable method. For example, if the opening 13c is not open in the upper surface of the holder body portion 13b, the support part 14 is first inserted into the holder body portion 13b through the corresponding one of the shaft insertion holes 13e. The support part 14 is then received in (sent downward into) the part accommodating portion 13d, which is located at a lower position, and thus longitudinally engaged with the backing 12 (the backing engagement portion 12a) and the blade holder 13 (the part accommodating portion 13d). In this case, since the opening 13c is not open in the upper surface of the holder body portion 13b, the blade holder 13 (the holder body portion 13b) has improved rigidity.

What is claimed is:

1. A wiper for a vehicle comprising:
   an elongated wiper strip having a wiping portion for wiping a surface to be wiped and a base portion;
   at least one backing extending in a longitudinal direction of the wiper strip, the backing imparting rigidity and resiliency to the wiper strip;
   a blade holder for holding the wiper strip and the backing at longitudinally middle portions of the wiper strip and the backing, the blade holder including a blade holding portion, the blade holding portion surrounding the base portion and the backing at the longitudinally middle portions and holding the base portion and the backing to restrict movement of the base portion and the backing each in a direction perpendicular to the longitudinal direction, the blade holder also including a pair of side surfaces facing in opposite directions;
   a coupling member having a pair of side walls facing the corresponding side surfaces, the coupling member being attached to the blade holder such that the coupling member is allowed to rotate about a rotational axis perpendicular to each of the two side surfaces; and
   a wiper arm having a distal coupling portion attached to the coupling member, wherein
   an engagement projection is formed on an outer side surface of each of the side walls of the coupling member, each of the engagement projections has an upper end surface and a lower end surface, the upper end surface and the lower end surface extending in the longitudinal direction of the wiper strip, the upper and lower end surfaces being parallel to each other and facing in opposite directions;
   the distal coupling portion has an upper cover wall for substantially covering an upper surface of the coupling member and a pair of side cover walls for substantially covering the outer side surfaces of the corresponding side walls,
   each of the side cover walls of the distal coupling portion includes an engagement recess that has an opening facing a longitudinal distal end,
   when the distal coupling portion is attached to the coupling member, each of the engagement projections is inserted into the corresponding engagement recess through the associated opening and is moved longitudinally in a state in which the corresponding engagement recess is engaged with the upper and lower end surfaces of the engagement projection in the vertical direction,
   the distal coupling portion has a stopper portion,
   the blade holder includes a stopper wall portion, and
   the stopper wall portion contacts the stopper portion in the longitudinal direction in a state in which the distal coupling portion is arranged at such a longitudinal position relative to the coupling member that each engagement recess and the corresponding engagement projection are not engaged with each other.

2. The wiper for a vehicle according to claim 1, wherein the stopper wall portion is one of a pair of stopper wall portions, and wherein each of the stopper wall portions extends in an vertical direction on the corresponding one of the side surfaces.

3. The wiper for a vehicle according to claim 1, wherein
   a lower end of at least one of the two side walls of the coupling member has a first lower end surface spaced in the longitudinal direction from the rotational axis and a second lower end surface arranged at a position corresponding to the rotational axis, the first lower end surface being located higher than the second lower end surface, and
   the stopper portion is a stopper projection that contacts the first lower end surface in a state in which the distal coupling portion is attached to the coupling member.

4. The wiper for a vehicle according to claim 3, wherein the stopper portion projects from an inner side surface of each of the two side cover walls.

5. The wiper for a vehicle according to claim 3, wherein
a guide groove is formed in each of the side surfaces of the blade holder,
a guide projection engageable with a corresponding one of the guide grooves is formed on an inner side surface of each of the side walls of the coupling member, and
the stopper projection is located at such a position that the stopper projection contacts a lower end of the guide projection in a state in which the distal coupling portion is attached to the coupling member, the stopper projection restricting rotation of the coupling member relative to the blade holder in one direction by the guide projection contacting an end of the corresponding guide groove.

6. The wiper for a vehicle according to claim 1, wherein
the engagement recesses each include an upper inner surface and a lower inner surface that become engaged with the upper end surface and the lower end surface of the corresponding engagement projection, respectively, in directions perpendicular to the longitudinal direction in a state in which the distal coupling portion is attached to the coupling member.

7. The wiper for a vehicle according to claim 1, wherein
the coupling member has an upper wall connecting the two side walls,
the upper wall has an elastic projection that projects upward from the upper wall and is flexible in the vertical direction,
the upper cover wall of the distal coupling portion has an engagement target portion, and
the engagement target portion receives and become engaged in the longitudinal direction with the elastic projection in a state in which the distal coupling portion is attached to the coupling member and the elastic projection is not flexed downward.

8. The wiper for a vehicle according to claim 7, wherein
the blade holder has an escape groove arranged at a position corresponding to the elastic projection, the escape groove permitting the elastic projection to flex downward in a state in which the distal coupling portion is attached to the coupling member.

9. A wiper for a vehicle comprising:
an elongated wiper strip having a wiping portion for wiping a surface to be wiped and a base portion;
at least one backing extending in a longitudinal direction of the wiper strip, the backing imparting rigidity and resiliency to the wiper strip;
a blade holder for holding the wiper strip and the backing at longitudinally middle portions of the wiper strip and the backing, the blade holder including a blade holding portion, the blade holding portion surrounding the base portion and the backing at the longitudinally middle portions and holding the base portion and the backing to restrict movement of the base portion and the backing each in a direction perpendicular to the longitudinal direction, the blade holder also including a pair of side surfaces facing in opposite directions;
a coupling member having a pair of side walls facing the corresponding side surfaces, the coupling member being attached to the blade holder such that the coupling member is allowed to rotate about a rotational axis perpendicular to each of the two side surfaces; and
a wiper arm having a distal coupling portion attached to the coupling member, wherein
an engagement projection is formed on an outer side surface of each of the side walls of the coupling member,
the distal coupling portion has an upper cover wall for substantially covering an upper surface of the coupling member and a pair of side cover walls for substantially covering the outer side surfaces of the corresponding side walls,
each of the side cover walls of the distal coupling portion includes an engagement recess that has an opening faced to a longitudinal distal end,
when the distal coupling portion is attached to the coupling member, each of the engagement projections is inserted into the corresponding engagement recess through the associated opening, and is moved longitudinally in a state in which the corresponding engagement recess is engaged with upper and lower end surfaces of the engagement projection in the vertical direction,
the distal coupling portion has a stopper portion,
the blade holder includes a stopper wall portion,
the stopper wall portion contacts the stopper portion in the longitudinal direction in a state in which the distal coupling portion is arranged at such a longitudinal position relative to the coupling member that each engagement recess and the corresponding engagement projection are not engaged with each other,
a lower end of at least one of the two side walls of the coupling member has a first lower end surface spaced in the longitudinal direction from the rotational axis and a second lower end surface arranged at a position corresponding to the rotational axis, the first lower end surface being located higher than the second lower end surface, and
the stopper portion is a stopper projection that contacts the first lower end surface in a state in which the distal coupling portion is attached to the coupling member.

10. The wiper for a vehicle according to claim 9, wherein the stopper portion projects from an inner side surface of each of the two side cover walls.

11. The wiper for a vehicle according to claim 9, wherein
a guide groove is formed in each of the side surfaces of the blade holder,
a guide projection engageable with a corresponding one of the guide grooves is formed on an inner side surface of each of the side walls of the coupling member, and
the stopper projection is located at such a position that the stopper projection contacts a lower end of the guide projection in a state in which the distal coupling portion is attached to the coupling member, the stopper projection restricting rotation of the coupling member relative to the blade holder in one direction by the guide projection contacting an end of the corresponding guide groove.

* * * * *